(12) United States Patent
Oh et al.

(10) Patent No.: US 9,383,509 B2
(45) Date of Patent: Jul. 5, 2016

(54) DISPLAY DEVICE

(71) Applicant: LG Display Co., Ltd., Seoul (KR)

(72) Inventors: Seok Hwan Oh, Gyeongsangbuk-do (KR); Ji Woon Min, Gyeongsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 46 days.

(21) Appl. No.: 14/340,761

(22) Filed: Jul. 25, 2014

(65) Prior Publication Data

US 2015/0092448 A1    Apr. 2, 2015

(30) Foreign Application Priority Data

Oct. 1, 2013 (KR) .......... 10-2013-0117190

(51) Int. Cl.
    *G09F 13/04* (2006.01)
    *F21V 8/00* (2006.01)
    *G06F 1/16* (2006.01)

(52) U.S. Cl.
    CPC .............. *G02B 6/0088* (2013.01); *G02B 6/005* (2013.01); *G06F 1/1601* (2013.01)

(58) Field of Classification Search
    CPC ......... G06F 1/1601; G06F 1/13; G06F 1/133; G06F 1/1637; H05K 5/02; G02F 2200/1612
    See application file for complete search history.

(56) References Cited

U.S. PATENT DOCUMENTS

2012/0262907 A1* 10/2012 Lee ........................ H05K 5/02
                                                                 362/97.1

* cited by examiner

*Primary Examiner* — Andrew Coughlin
(74) *Attorney, Agent, or Firm* — Morgan, Lewis & Bockius LLP

(57) ABSTRACT

Disclosed is a display device. The display device includes a display panel, a plurality of fixers arranged at certain intervals and adhered to a bottom edge of the display panel, a guide panel configured to support the plurality of fixers, a rear cover configured to support the guide panel, a side cover configured to surround a side of the rear cover and constrain positions of the plurality of fixers, a plurality of panel supporting parts configured to support a bottom of the display panel to which the plurality of fixers are not adhered and which is disposed between the plurality of fixers, and a plurality of ribs provided at the guide panel or the side cover configured to support the plurality of panel supporting parts.

14 Claims, 8 Drawing Sheets

DISPLAY DEVICE

CROSS-REFERENCE TO RELATED APPLICATIONS

This application claims the benefit of Korean Patent Application No. 10-2013-0117190 filed on Oct. 1, 2013, which is hereby incorporated by reference as if fully set forth herein.

BACKGROUND OF THE INVENTION

1. Field of the Invention

The present invention relates to a display device, and more particularly, to a display device in which a display panel is not broken down or damaged by an external force.

2. Discussion of the Related Art

Recently, liquid crystal display (LCD) devices, plasma display panels (PDPs), and organic light emitting display devices are being widely used as display devices replacing cathode ray tubes which are initial display devices. The display devices include a display panel, which displays an image, and a bezel which covers a border of the display panel. Bezel-zeroised display devices, from which a front case (and/or a front cover) configuring a bezel is removed, are being recently developed.

FIG. 1 is a view for describing a related art display device, FIG. 2 is a cross-sectional view taken along line I-I' of FIG. 1.

With reference to FIGS. 1 to 3, the related art display device includes a display panel 10, a backlight unit 20, a plurality of fixers 30, a guide panel 40, a rear cover 50, and a side cover 60.

The display panel 10 includes first and second substrates 11 and 13 which are facing-coupled to each other with a liquid crystal layer therebetween. A lower polarizer 15 is adhered to a bottom of the first substrate 11, and an upper polarizer 17 is adhered to a top of the second substrate 13.

The backlight unit 20 irradiates light onto the display panel 10, and includes a light source (not shown), a light guide panel 21 that travels light (which is incident from the light source) to the display panel 10, a reflective sheet 23 that is disposed under the light guide panel 21, and a plurality of optical sheets 25 that are disposed on the light guide panel 21 to enhance a luminance characteristic of the light.

Each of the plurality of fixers is formed to have a cover insertion space. The plurality of fixers are arranged at certain intervals, and adhered to a bottom edge of the display panel 10 to support the display panel 10.

The guide panel 40 is formed in a tetragonal belt shape to have a ┍-shaped cross-sectional surface, and supports the plurality of fixers 30.

The rear cover 50 accommodates the backlight unit 20, and supports the guide panel 40.

The side cover 60 includes a cover sidewall 62, a plurality of fixer fixing parts 64, and a plurality of panel supporting parts 66. Here, the cover sidewall 62 is vertically formed to have a certain height, and covers a side of the guide panel 40. Each of the plurality of fixer fixing parts 64 is bent from a top of the cover sidewall 62 so as to be parallel to a bottom edge of the display panel 10, and is inserted into a cover insertion space of a corresponding fixer 30. Therefore, a movement of each of the plurality of fixers 30 is limited in up, down, left, and right directions. Furthermore, the plurality of panel supporting parts 66 are bent from a top of the cover sidewall 62 so as to be respectively disposed between the plurality of fixer fixing parts 64, and supports a bottom of the display panel to which the plurality of fixers 30 are not adhered.

In the related art display device, since the display panel 10 is fixed by the plurality of fixers 30, a front case (and/or a front cover) configuring a bezel is not needed, and thus, a thickness is reduced, and a bezel width is zeroised. Accordingly, the related art display device has an enhanced aesthetic appearance in design.

However, since the related art display device has structural characteristic in which the front case (and/or the front cover) is removed, when an external force is applied from the outside to the display panel 10, the display panel 10 is damaged or cracked by the external force. That is, as illustrated in FIG. 3, when an external force EF is applied to the display panel 10, the panel supporting part 66 of the side cover 60 is bent by the external force EF applied to the display panel 10, and a step height occurs between the display panel 10 area, which is supported by the bent panel supporting part 66, and the display panel 10 area supported by the fixer 30. For this reason, the display panel 10 is damaged or cracked.

SUMMARY OF THE INVENTION

Accordingly, the present invention is directed to a display device that substantially obviates one or more problems due to limitations and disadvantages of the related art.

An object of the present invention is to provide a display device in which a display panel is not broken down or damaged by external force.

In addition to the aforesaid objects of the present invention, other features and advantages of the present invention will be described below, but will be clearly understood by those skilled in the art from descriptions below.

Additional advantages and features of the invention will be set forth in in the description which follows, and in part will be apparent from the description, or may be learned by practice of the invention. The objectives and other advantages of the invention may be realized and attained by the structure particularly pointed out in the written description and claims hereof as well as the appended drawings.

To achieve these and other advantages and in accordance with the purpose of the present invention, as embodied and broadly described herein, a display device includes: a display panel; a plurality of fixers arranged at certain intervals, and adhered to a bottom edge of the display panel; a guide panel configured to support the plurality of fixers; a rear cover configured to support the guide panel; a side cover configured to surround a side of the rear cover, and constrain positions of the plurality of fixers; a plurality of panel supporting parts configured to support a bottom of the display panel to which the plurality of fixers are not adhered and which is disposed between the plurality of fixers; and a plurality of ribs provided at the guide panel or the side cover configured to support the plurality of panel supporting parts.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

The terms described in the specification should be understood as follows.

As used herein, the singular forms "a", "an" and "the" are intended to include the plural forms as well, unless the context clearly indicates otherwise. The terms "first" and "second" are for differentiating one element from the other element, and these elements should not be limited by these terms.

It will be further understood that the terms "comprises", "comprising,", "has", "having", "includes" and/or "including", when used herein, specify the presence of stated features, integers, steps, operations, elements, and/or components, but do not preclude the presence or addition of one or more other features, integers, steps, operations, elements, components, and/or groups thereof.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

The term "on" should be construed as including a case where one element is formed at a top of another element and moreover a case where a third element is disposed therebetween.

Hereinafter, embodiments of a display device according to the present invention will be described in detail with reference to the accompanying drawings.

Figure 1:
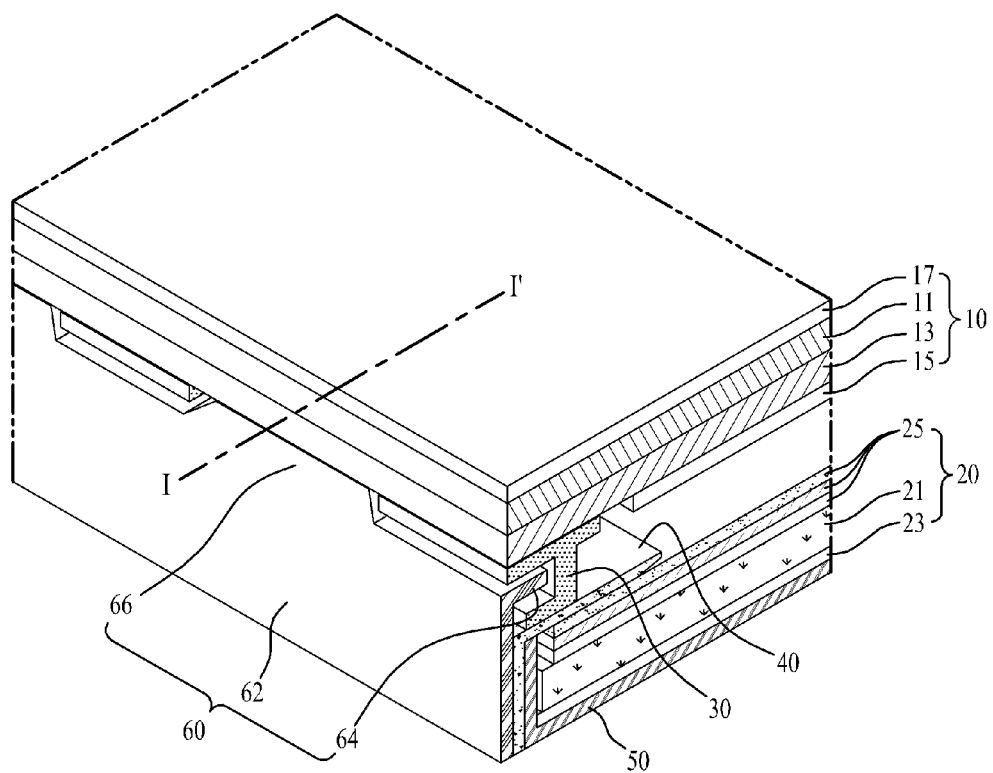
FIG. 1 is a view for describing a related art display device.
Figure 2:
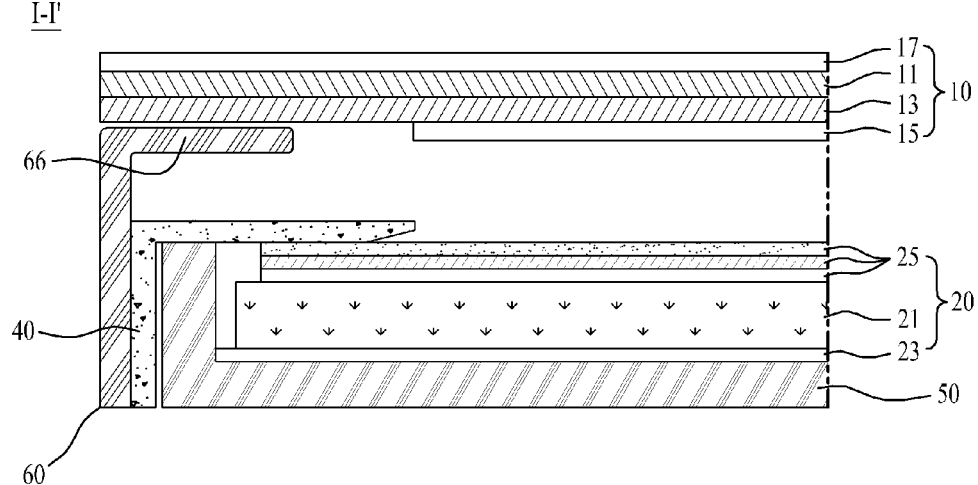
FIG. 2 is a cross-sectional view taken along line I-I' of FIG. 1.
Figure 3:
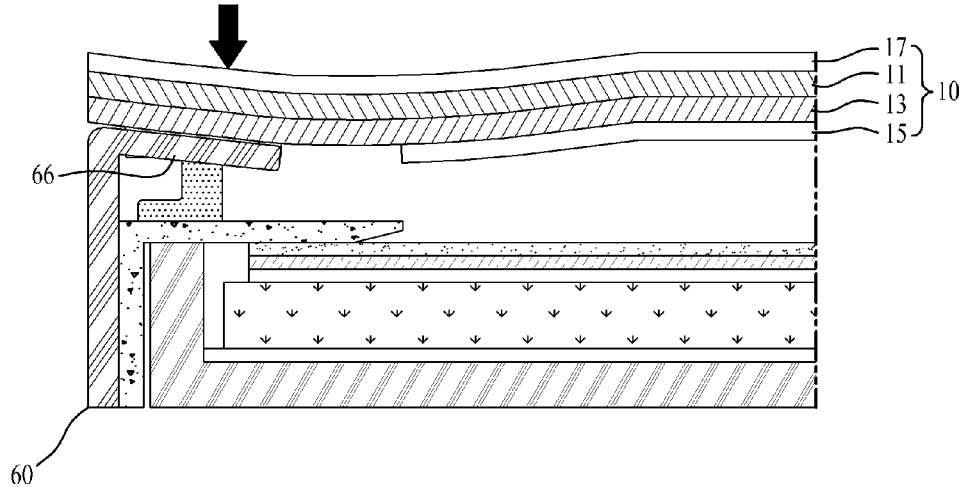
FIG. 3 is a cross-sectional view for describing a damage of a display panel caused by an external force, in the related art display device.
Figure 4:
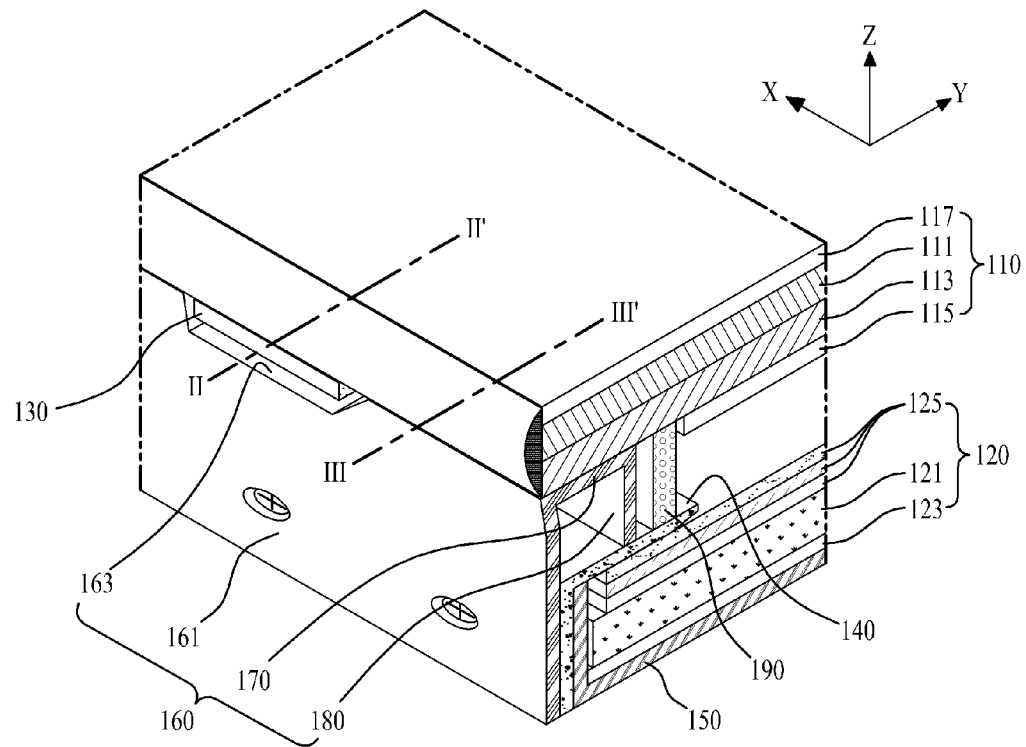
FIG. 4 is a view illustrating a display device according to a first embodiment of the present invention of which a portion is cut.
Figure 5:
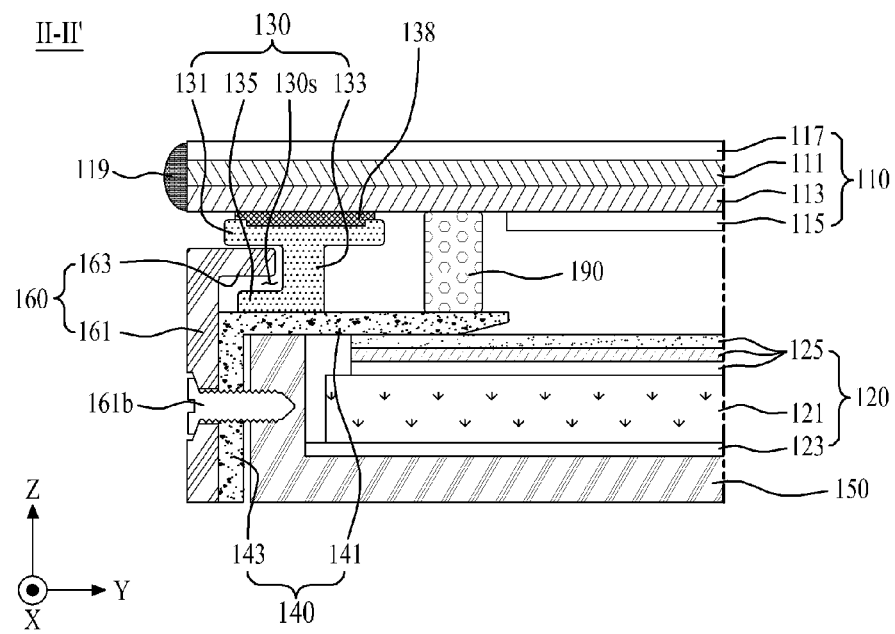
FIG. 5 is a cross-sectional view illustrating a cross-sectional surface taken along line II-II' of FIG. 4.
Figure 6:
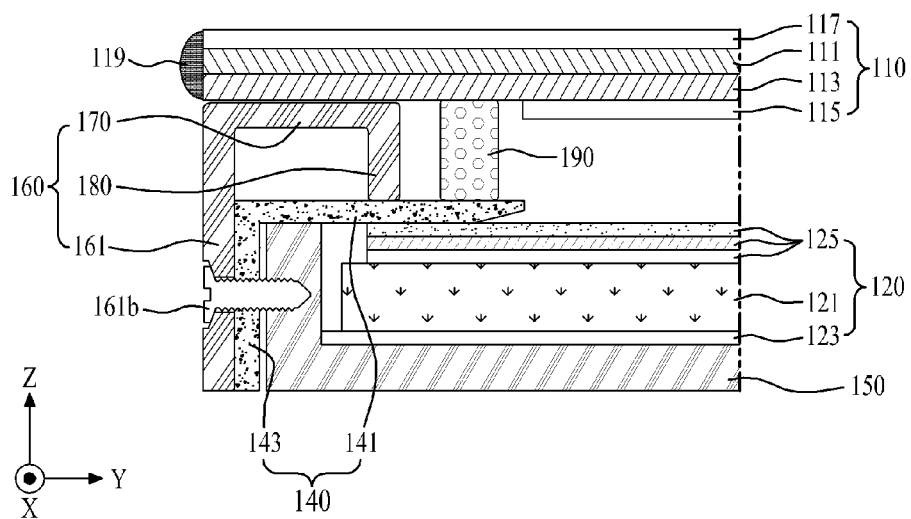
FIG. 6 is a cross-sectional view illustrating a cross-sectional surface taken along line III-III' of FIG. 4.

FIG. 4 is a view illustrating a display device according to a first embodiment of the present invention of which a portion is cut. FIG. 5 is a cross-sectional view illustrating a cross-sectional surface taken along line II-II' of FIG. 4. FIG. 6 is a cross-sectional view illustrating a cross-sectional surface taken along line III-III' of FIG. 4.

With reference to FIGS. 4 to 6, the display device according to the first embodiment of the present invention includes a display panel 110, a backlight unit 120, a plurality of fixers 130, a guide panel 140, a rear cover 150, a side cover 160, a plurality of panel supporting parts 170, and a plurality of ribs 180.

The display panel 110 includes first and second substrates 111 and 113 which are facing-coupled to each other with a liquid crystal layer therebetween. A lower polarizing member 115 is adhered to the first substrate 111, and an upper polarizing member 117 is adhered to an entire surface of the second substrate 113.

The first substrate 111 includes a plurality of pixels which are respectively formed in a plurality of areas defined by intersections of a plurality of gate lines (not shown) and a plurality of data lines (not shown). Each of the plurality of pixels may include a thin film transistor (TFT, not shown) connected to a corresponding gate line and a corresponding data line and a common electrode which is formed adjacent to the pixel electrode to receive a common voltage. In this case, the common electrode may be formed on the second substrate 113 depending on a driving mode of the liquid crystal layer. A pad part connected to each signal line is provided at one side edge of the first substrate 111, and a panel driver (not shown), which includes a data driving integrated circuit (IC, not shown), a timing controller, and a power supply, is coupled to the pad part. A gate driving circuit (not shown) for supplying a gate signal to the display panel 110 is provided at one side of the first substrate 111 by a TFT manufacturing process. The first substrate 111 generates an electric field corresponding to a difference voltage between a data voltage and the common voltage which are applied to each pixel, thereby adjusting a light transmittance of the liquid crystal layer.

The second substrate 113 includes a color filter corresponding to each pixel formed on the first substrate 111, and is facing-coupled to the first substrate 111 with the liquid crystal layer therebetween. In this case, the common electrode which receives the common voltage depending on the driving mode of the liquid crystal layer may be formed on the second substrate 113. The second substrate 113 filters light incident through the liquid crystal layer by using the color filter to emit color light to the outside, thereby allowing a color image to be displayed by the display panel 110.

The lower polarizing member 115 is adhered to a bottom of the first substrate 111, and polarizes light irradiated from the backlight unit 120 onto the display panel 110.

The upper polarizing member 117 according to an embodiment may be an upper polarizing film that is adhered to an entire surface of the second substrate 113, and polarizes light which passes through the second substrate 113 and is emitted to the outside. The upper polarizing member 117 may include the upper polarizing film and a retarder film that is adhered to an entire surface of the upper polarizing film, and separates incident light, polarized by the upper polarizing film, into different polarization states. Here, the retarder film include a plurality of retarder patterns (not shown) that are alternately arranged so that a left image and a right image, which are respectively displayed in a left display area and a right display area which are defined in the display panel 110, are separated into different polarization states.

An entire surface and at least three sides of the display panel 10 are not covered by a bezel instrument material such as a separated upper case or front case, and are exposed to outside the display device. Therefore, by exposing an entire surface and side of the display panel 110 to the outside, a bezel configuring a front border of the display panel 110 may be removed or zeroised, and a step height of a border may be removed. Accordingly, a display device with an enhanced aesthetic appearance can be provided.

Since the side of the display panel 110 is directly exposed to the outside, the upper polarizing member 117 adhered to the second substrate 113 may be partially detached by a user's touch. To solve such a problem, a side sealing member 119 is provided at each side of the display panel 110. The side sealing member 119 is provided at each of second to fourth sides of the display panel 110 except a first side of the display panel 110. Here, the panel driver is connected to the first side of the display panel 110, and the panel driver and the first side of the display panel 110 are covered by a lower cover (not shown), whereby the side sealing member 119 may not be provided at the first side of the display panel 110. The side sealing member 119 may be formed of a colored resin or a light blocking resin, for preventing a side light leakage of the display panel 110 caused by total internal reflection which occurs in the first substrate 111. A color of the side sealing member 119 may be colorless (or transparent) or colored (for example, blue, red, bluish green, or black), but is not limited thereto. The color of the side sealing member 119 may be selected depending on a design of the display device.

The backlight unit 120 is disposed under the display panel 110, and irradiates light onto the display panel 110. To this end, the backlight unit 120 includes a light guide panel 121, a reflective sheet 123, and a plurality of optical sheets 125.

The light guide panel 121 is formed in a flat (or wedge) shape to have a light incident surface, and travels light, which is incident through the light incident surface from a light source (not shown), to the display panel 110. Here, the light source may include a fluorescent lamp or a light emitting diode (LED). The reflective sheet 123 is disposed on a bottom of the light guide panel 121, and reflects light, which is incident through the bottom of the light guide panel 121, to the display panel 110. The plurality of optical sheets 125 are disposed on the light guide panel 121, and enhance a luminance characteristic of the light which travels from the light guide panel 121 to the display panel 110.

The plurality of fixers 130 are formed to each include a cover insertion space 130s, and are adhered (or coupled) at certain intervals to a bottom edge of the display panel 110 by a fixer adhering member 138. Here, the fixer adhering member 138 may be formed of a double-sided table, a heat-hardening adhesive, or a photocurable adhesive, but may be formed of a photocurable adhesive for enhancing productivity. To this end, each of the plurality of fixers 130 may include an upper plate 131, a fixer sidewall 133, and a lower plate 135.

The upper plate 131 is formed to have a certain area, and is adhered to the display panel 110 (more particularly, a bottom edge of the first substrate 111) by the fixer adhering member 138. The upper plate 131 includes a charging part which is formed to be recessed from an upper surface, and is charged with the fixer adhering member 138. Furthermore, a dam for preventing the fixer adhering member 138 from running over to the outside of the upper plate 131 may be formed at a top of the upper plate 131.

The fixer sidewall 133 is vertically coupled to a bottom of the upper plate 131, and supports the upper plate 131. Here, the fixer sidewall 133 and the upper plate 131 may be formed as one body to have a ⊤-shaped, ──⊤-shaped, or ⌐-shaped cross-sectional surface.

The lower plate 135 is coupled to a bottom of the fixer sidewall 133 so as to be parallel to the upper plate 131, and is movably attached to the guide panel 140. Here, the lower plate 131 and the fixer sidewall 133 may be formed as one body to have a ⌐-shaped, ──⌐-shaped, or ⊥-shaped cross-sectional surface. The cover insertion space 130s is provided between the lower plate 135 and the upper plate 131 depending on a height of the fixer sidewall 133.

Each of the plurality of fixers 130 may be formed of a plastic material by an injection method in consideration of manufacturability, weight, and manufacturing cost. Here, each of the plurality of fixers 130 may be formed of a plastic material, a general-use plastic material, or a general-use engineering plastic material, such as a colorless resin, a colored (for example, blue, red, bluish green, or black) resin, a light blocking resin. For example each of the plurality of fixers 130 may be formed of poly carbonate (PC).

The guide panel 140 movably supports the plurality of fixers 130, and supports the plurality of panel supporting parts 170. To this end, the guide panel 140 may include a fixer supporting part 141 and a guide sidewall 143.

The fixer supporting part 141 is formed in a tetragonal belt shape to have a l-shaped or stair-shaped cross-sectional surface, and supports the plurality of panel supporting parts 170. The plurality of fixers 130 are provided at the fixer supporting part 141 so as to be movable in at least one of an X-axis direction, a Y-axis direction, and a Z-axis direction. A partition wall pad 190 is adhered to an inner upper surface of the fixer supporting part 141. The partition wall pad 190 is formed of a soft material, prevents light, irradiated from the backlight unit 120, from being leaked to the outside, and prevents penetration of a foreign material such as external dust.

The guide sidewall 143 is vertically formed at an outer bottom edge of the fixer supporting part 141, supports the fixer supporting part 141, and surrounds a side of the rear cover 150. Here, the guide sidewall 143 may not be provided depending on a structure of the display device.

The rear cover 150 is formed in a box shape with a top opened, accommodates the backlight unit 120, and supports the guide panel 140. The rear cover 150 is directly exposed to outside the display device, and configures a final rear surface of the display device.

Figure 7:
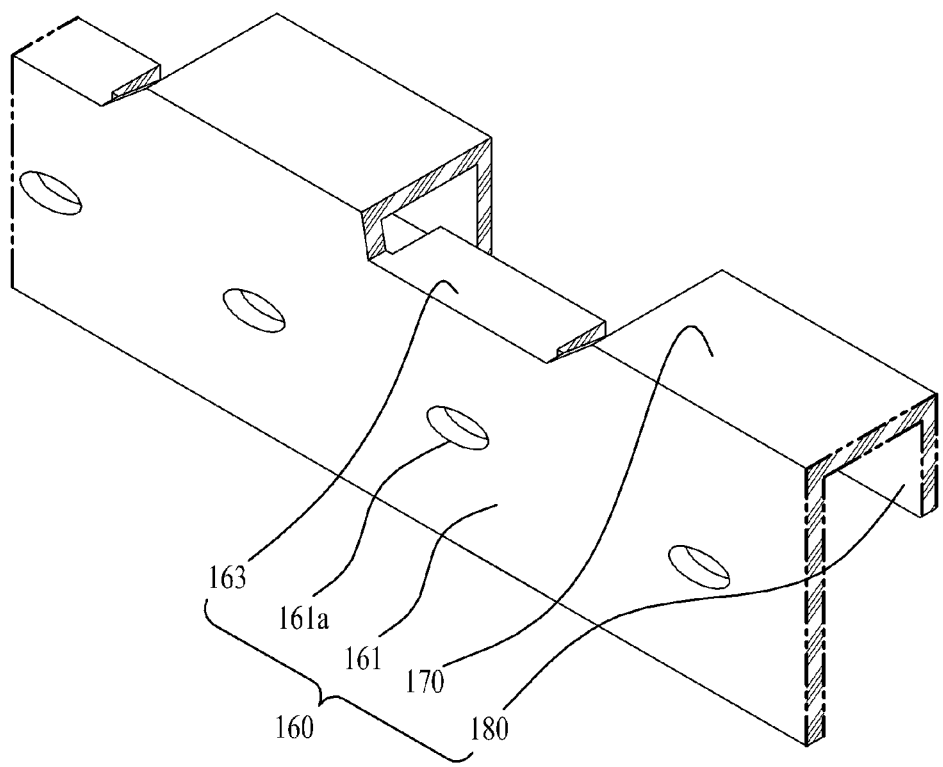
FIG. 7 is a perspective view illustrating a portion of a side cover into which a plurality of panel supporting parts and a plurality of ribs are integrated, according to an embodiment of the present invention.

The side cover 160 is inserted into the cover insertion space 130s of each of the plurality of fixers 130, constrains positions of the plurality of fixers 130, and surrounds the guide panel 140 and a side of the rear cover 150. The side cover 160 surrounds the guide panel 140 and the side of the rear cover 150 except each side of the display panel 110, is directly exposed to outside the display device, and configures the final side of the display device. To this end, as illustrated in FIG. 7, the side cover 160 includes a cover sidewall 161 and a plurality of fixer fixing parts 163.

The cover sidewall 161 is vertically formed to a certain height to surround the guide panel 140 and the side of the rear cover 150. Each of the panel supporting parts 170 are integrated into the cover sidewall 161. A screw insertion hole 161a is formed at the cover sidewall 161, a screw through hole is formed at a guide sidewall of the guide panel 140 corresponding to the screw insertion hole 161a, and a screw coupling hole is formed at the side of the rear cover 150 corresponding to the screw through hole. Therefore, the cover sidewall 161 is inserted into the screw insertion hole 161a, and is coupled to the side of the rear cover 150 by a screw 161b, coupled to a screw coupling hole of the rear cover 150, through the screw through hole of the guide panel 140. The side cover 160 may be formed in four division structures, and each of four divided portions of the side cover 160 is coupled to each side of the rear cover 150 by a plurality of the screws 161b, and has a tetragonal frame shape.

Each of the plurality of fixer fixing parts 163 may be bent from the cover sidewall 161 facing each of the plurality of fixers 130. Therefore, the cover sidewall 161 and the fixer fixing parts 163 have a ⌐-shaped cross-sectional surface. Each of the plurality of fixer fixing parts 163 is inserted into the cover insertion space 130s of a corresponding fixer 130, and thus constrains a movement of each fixer 130 in the Z-axis direction so that the display panel 110 is not dropped to the front. Also, when the plurality of fixers 130 adhered to the display panel 110 are solidly fixed so as not to be moved, the liquid crystal layer is changed by a squash of the display panel 110 due to an external force, causing a leakage of light. To prevent such light leakage, the plurality of fixer fixing parts 163 guide the plurality of fixers 130 adhered to the display panel 110 in order for the plurality of fixers 130 to be moved within a certain distance in at least one of the X-axis direction, the Y-axis direction, and the Z-axis direction, thereby preventing the light leakage.

Each of the plurality of panel supporting parts 170 is formed as one body with the side cover 160 to have a flat shape, and supports a bottom of the display panel 110 to which the plurality of fixers 130 are not adhered. In detail, the plurality of panel supporting parts 170 are bent from the cover sidewall 161 of the side cover 160 corresponding to respective spaces between the plurality of fixers 130 to have a certain area, are respectively disposed between the plurality of fixers 130, and supports the bottom of the display panel 110 to which the plurality of fixers 130 are not adhered. Therefore, the cover sidewall 161 and the panel supporting part 170 may have a ⌐-shaped cross-sectional surface. Both surfaces of each of the plurality of panel supporting parts 170 may be adhered to the bottom of the display panel 110 by an adhesive member (not shown) such as a double-sided tape.

Each of the plurality of ribs is formed as one body with a corresponding panel supporting part 170, is disposed at the fixer supporting part 141 of the guide panel 140, and supports a corresponding panel supporting part 170. That is, the plurality of ribs 180 are vertically bent from an end of the panel supporting part 170 so as to be parallel to the cover sidewall 161, and is disposed at the fixer supporting part 141 of the guide panel 140. Therefore, the panel supporting part 170 and the rib 180 are formed as one body to have a ¬-shaped cross-sectional surface, and thus, a top of the cover sidewall 161, the panel supporting part 170, and the rib 180 which are formed as one body have a ⊓-shape. Both sides of each of the plurality of panel supporting parts 170, which support the bottom of the display panel 110 to which the plurality of fixers 130 are not adhered, are supported by the cover sidewall 161 and the rib 180, and thus, the plurality of panel supporting parts 170 having a flat shape are not bent by an external force applied to the display panel 110. As a result, the plurality of ribs 180 prevent the panel supporting part 170 from being sagged and bent by the external force, and thus prevents the display panel 110 from being damaged or cracked by the external force.

Since the display device according to the first embodiment of the present invention includes the plurality of ribs 180 respectively supporting the plurality of panel supporting parts 170 supporting the bottom of the display panel 110 to which the plurality of fixers 130 are not adhered, the panel supporting part 170 is not bent by an external force, and thus, the display panel 110 is not damaged or broken down by the external force.

Figure 8:
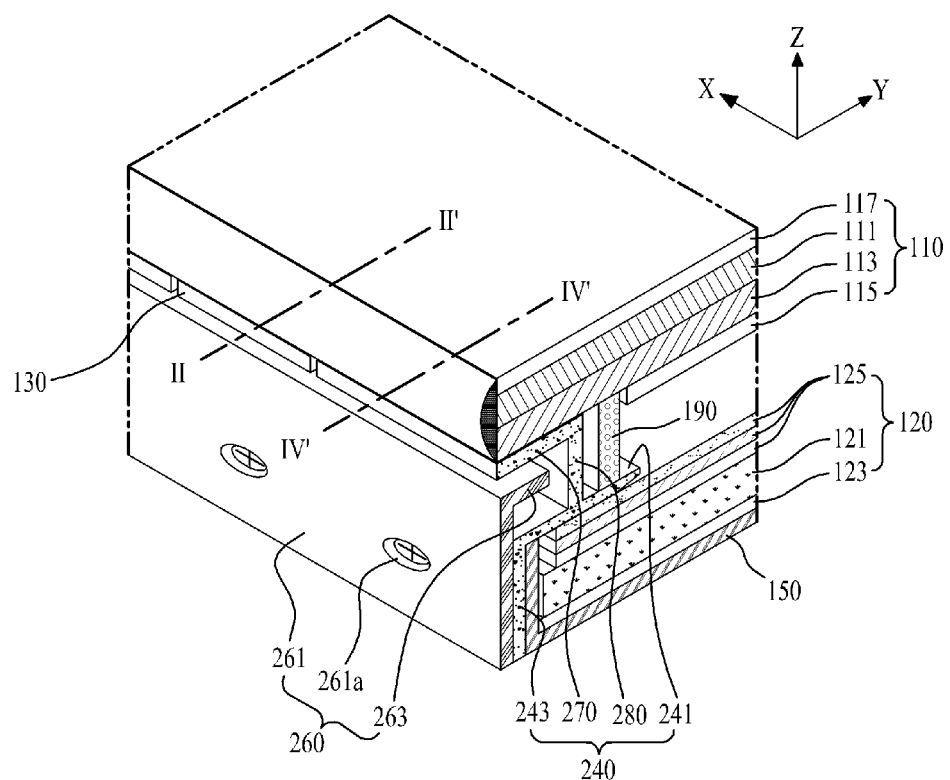
FIG. 8 is a view illustrating a display device according to a second embodiment of the present invention of which a portion is cut.
Figure 9:
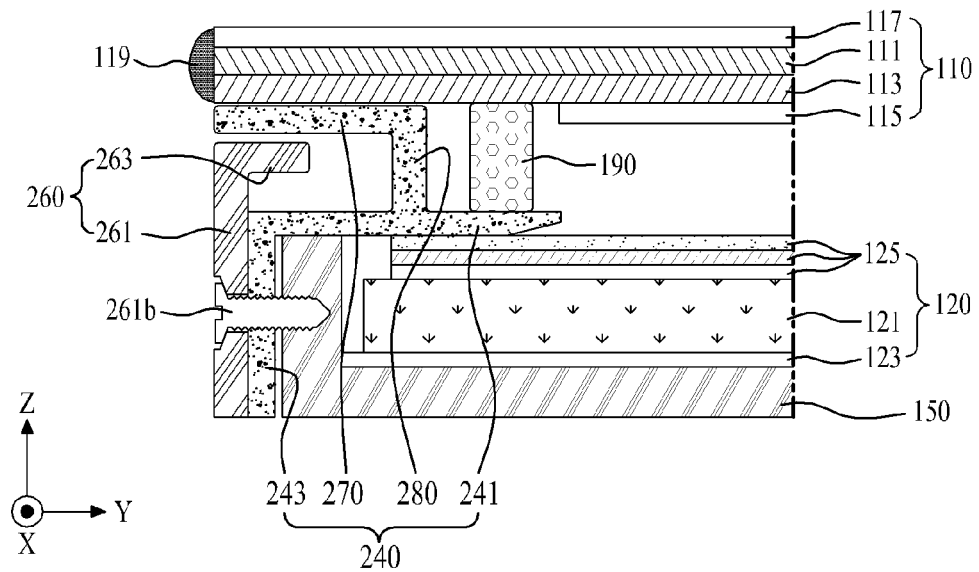
FIG. 9 is a cross-sectional view illustrating a cross-sectional surface taken along line IV-IV' of FIG. 8.
Figure 10:
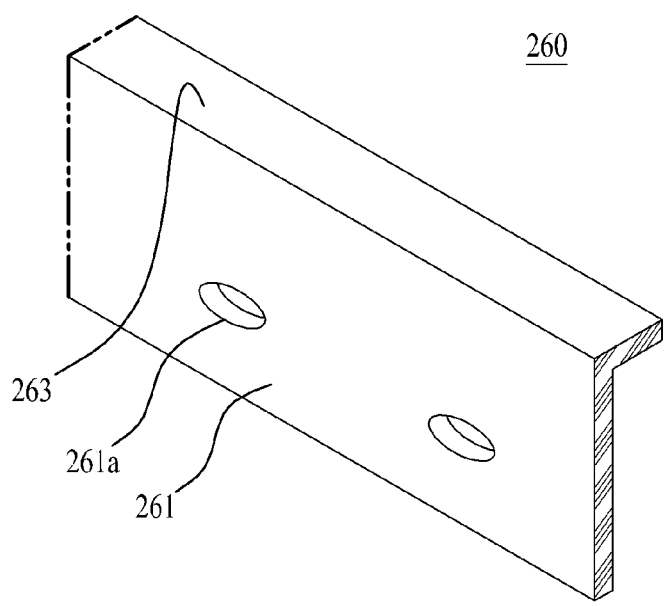
FIG. 10 is a perspective view illustrating a portion of a side cover of FIG. 8.

FIG. 8 is a view illustrating a display device according to a second embodiment of the present invention of which a portion is cut. FIG. 9 is a cross-sectional view illustrating a cross-sectional surface taken along line IV-IV' of FIG. 8. FIG. 10 is a perspective view illustrating a portion of a side cover of FIG. 8.

With reference to FIGS. 8 to 10, the display device according to the second embodiment of the present invention includes a display panel 110, a backlight unit 120, a plurality of fixers 130, a guide panel 240, a rear cover 150, a side cover 260, a plurality of panel supporting parts 270, and a plurality of ribs 280. The display device according to the second embodiment of the present invention having the configuration is implemented by changing the structure of display device according to the first embodiment of the present invention illustrated in FIGS. 4 to 7, namely, by changing structures of the guide panel 240, the side cover 260, the panel supporting parts 270, and the ribs 280. Thus, only the guide panel 240, the side cover 260, the panel supporting parts 270, and the ribs 280 will be described below.

The guide panel 240 movably supports the plurality of fixers 130, and supports the plurality of ribs 280. To this end, the guide panel 240 may include a fixer supporting part 241 and a guide sidewall 243.

The fixer supporting part 241 is formed in a tetragonal belt shape to have a l-shaped or stair-shaped cross-sectional surface. The plurality of fixers 130 are provided at the fixer supporting part 241 so as to be movable in at least one of an X-axis direction, a Y-axis direction, and a Z-axis direction. Each of the plurality of ribs 280 is integrated into a top of the fixer supporting part 241.

The guide sidewall 243 is vertically formed at an outer bottom edge of the fixer supporting part 241, supports the fixer supporting part 241, and surrounds a side of the rear cover 150. Here, the guide sidewall 243 may not be provided depending on a structure of the display device.

The side cover 260 is inserted into the cover insertion space 130s of each of the plurality of fixers 130, constrains positions of the plurality of fixers 130, and surrounds the guide panel 240 and a side of the rear cover 150. The side cover 260 surrounds the guide panel 240 and the side of the rear cover 150 except each side of the display panel 110, is directly exposed to outside the display device, and configures the final side of the display device. To this end, as illustrated in FIGS. 9 and 10, the side cover 260 includes a cover sidewall 261, which has a ⌐-shaped cross-sectional surface, and a plurality of fixer fixing parts 263.

The cover sidewall 261 is vertically formed to a certain height to surround the guide panel 240 and the side of the rear cover 150. A screw insertion hole 261a is formed at the cover sidewall 261, a screw through hole 243a is formed at a guide sidewall 243 of the guide panel 240 corresponding to the screw insertion hole 261a, and a screw coupling hole is formed at the side of the rear cover 150 corresponding to the screw through hole 243a. Therefore, the cover sidewall 261 is inserted into the screw insertion hole 261a, and is coupled to the side of the rear cover 150 by a screw 261b, coupled to a screw coupling hole of the rear cover 150, through the screw through hole 243a of the guide panel 240.

The fixer fixing part 263 may be bent from a top of the cover sidewall 261 so as to support a cover insertion space 130s of each of the plurality of fixers and the plurality of panel supporting parts 270. The fixer fixing part 263 supports the plurality of panel supporting parts 270, and thus prevents the plurality of panel supporting parts 270 from being bent by an external force applied to the display panel 110. Also, each of the plurality of fixer fixing parts 263 is inserted into the cover insertion space 130s of a corresponding fixer 130, and thus constrains a movement of each fixer 130 in the Z-axis direction so that the display panel 110 is not dropped to the front.

Also, when the plurality of fixers 130 adhered to the display panel 110 are solidly fixed so as not to be moved, the liquid crystal layer is changed by a squash of the display panel 110 due to an external force, causing a leakage of light. To prevent such light leakage, the plurality of fixer fixing parts 263 guide the plurality of fixers 130 adhered to the display panel 110 in order for the plurality of fixers 130 to be moved within a certain distance in at least one of the X-axis direction, the Y-axis direction, and the Z-axis direction, thereby preventing the light leakage.

The side cover 260 may be formed in four division structures, and each of four divided portions of the side cover 260 is coupled to each side of the rear cover 150 by a plurality of the screws 261b, and has a tetragonal frame shape.

Figure 11:
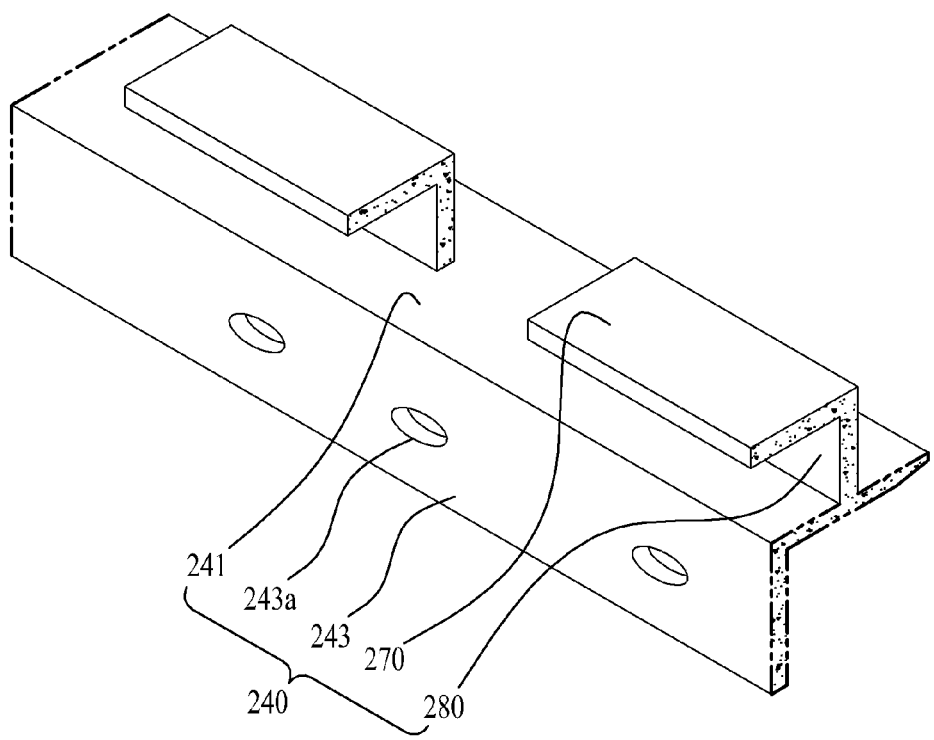
FIG. 11 is a perspective view illustrating a portion of a guide panel cover into which a plurality of panel supporting parts and a plurality of ribs are integrated, according to an embodiment of the present invention.

The plurality of ribs 280, as illustrated in FIGS. 9 and 11, are formed to a certain height so as to be vertical to the fixer supporting part 241 of the guide panel 240 corresponding to respective spaces between the plurality of fixers 130. In this case, each of the plurality of ribs 280 is formed as one body with the fixer supporting part 241, and thus, the fixer supporting part 241 and the rib 280 have a ⊥-shaped cross-sectional surface.

Each of the plurality of panel supporting parts 270 is formed as one body with a corresponding rib 280, and supports a bottom of the display panel 110 to which the plurality of fixers 130 are not adhered. That is, each of the plurality of panel supporting parts 270 is formed in a flat shape which is disposed between the plurality of fixers 130, and is coupled to a top of a corresponding rib 280 so as to face a top of the fixer supporting part 241. Therefore, the panel supporting part 270 and the rib 280 have a ⌐-shaped, ¬-shaped, or ⊤-shaped cross-sectional surface. The plurality of panel supporting parts 270 support the bottom of the display panel 110 to which the plurality of fixers 130 are not adhered and which is disposed between the plurality of fixers 130.

An outer bottom of each of the plurality of panel supporting parts 270 is supported by a fixer fixing part 263 of the side cover 260. Here, since the fixer fixing part 263 is bent at an entire top of the cover sidewall 261, the fixer fixing part 263 is inserted into the cover insertion space 130s of each of the plurality of fixers 130, is inserted into a space between the fixer supporting part 241 and the panel supporting part 270 which face each other, and supports the plurality of panel supporting parts 270.

Since the display device according to the second embodiment of the present invention includes the plurality of ribs 280 respectively supporting the plurality of panel supporting parts 270 supporting the bottom of the display panel 110 to which the plurality of fixers 130 are not adhered, the panel supporting part 270 is not bent by an external force, and thus, the display panel 110 is not damaged or broken down by the external force.

In the display device according to the embodiments of the present invention, the display panel 110 has been described above as being a liquid crystal display panel including the liquid crystal layer, but is not limited thereto. For example, the display panel 110 may be replaced with an organic light emitting display panel including an organic light emitting element. In this case, since the organic light emitting display panel is a self-emitting device, the above-described backlight unit 120 is not provided.

The display panel 110 that is the organic light emitting display panel includes the first substrate 111 and the second substrate 113 that is facing-coupled to the first substrate 111.

The first substrate 111 includes a plurality of pixels which are respectively formed in a plurality of areas defined by a plurality of gate lines, a plurality of data lines, and a plurality of power lines. Each of the plurality of pixels includes at least one switching transistor connected to a corresponding gate line and a corresponding data line, at least one driving transistor connected to the switching transistor and a corresponding power line, and an organic light emitting element that emits light with a current controlled by turn-on of the driving transistor.

The second substrate 113 is facing-coupled to the first substrate 111, and acts as an encapsulation substrate which protects the plurality of pixels (particularly, a plurality of the organic light emitting elements), formed on the first substrate 111, from external moisture and oxygen.

According to the embodiments of the present invention, the plurality of ribs support the panel supporting part that supports the bottom of the display panel to which the plurality of fixers are not adhered, and thus, the panel supporting part is prevented from being bent by an external force. Accordingly, the display panel can be prevented from being damaged or broken down.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A display device, comprising:
    a display panel;
    a plurality of fixers arranged at certain intervals, and adhered to a bottom surface of the display panel;
    a guide panel configured to support the plurality of fixers;
    a rear cover configured to support the guide panel; and
    a side cover configured to support the plurality of fixers and the display panel, and to constrain the plurality of fixers,
    wherein the side cover comprises:
    a cover sidewall configured to surround a side of the rear cover;
    a plurality of fixer fixing parts bent from the cover sidewall facing the plurality of fixers, and inserted into the plurality of fixers;
    a plurality of panel supporting parts configured to support and contact the bottom surface of the display panel at positions where the plurality of fixers are absent, the plurality of panel supporting parts being bent from the cover sidewall at portions between the plurality of fixers; and
    a plurality of ribs vertically bent from an end of the panel supporting part so as to be parallel to the cover sidewall, and disposed on the guide panel.

2. The display device of claim 1, wherein each of the plurality of fixers comprises:
    an upper plate adhered to the display panel;
    a fixer sidewall vertically coupled to a bottom of the upper plate; and
    a lower plate coupled to a bottom of the fixer sidewall to face the upper plate, and provided at the guide panel,
    wherein a cover insertion space is disposed between the upper plate and the lower plate.

3. The display device of claim 2, wherein a top of the cover sidewall, the panel supporting part, and the rib are formed as one body such that the cover side wall and the panel supporting part define a right angle and the panel supporting part and the rib define a right angle.

4. The display device of claim 1, further comprising a backlight unit accommodated in the rear cover to irradiate light onto the display panel.

5. The display device of claim 4, further comprising a partition wall pad adhered to an inner upper surface of the fixer supporting part.

6. The display device of claim 1, wherein the plurality of panel supporting parts are positioned above the plurality of fixer fixing parts.

7. A display device, comprising:
a display panel;
a plurality of fixers arranged at certain intervals, and adhered to a bottom surface of the display panel;
a guide panel configured to support the plurality of fixers and the display panel;
a rear cover configured to support the guide panel; and
a side cover configured to surround a side of the rear cover, and inserted into the plurality of fixers,
wherein the guide panel comprises:
a fixer supporting part provided at the rear cover to support the plurality of fixers,
a plurality of ribs provided vertically from a top of the fixer supporting part at positions between the plurality of fixers; and
a plurality of panel supporting parts coupled to respective tops of the plurality of ribs to face the top of the fixer supporting part, and to support the display panel by contacting the bottom surface of the display panel at the positions between the plurality of fixers.

8. The display device of claim 7, wherein the side cover comprises:
a cover sidewall configured to surround a side of the rear cover; and
a fixer fixing part bent from the a top of the cover sidewall, and inserted into a cover insertion space of each of the plurality of fixers.

9. The display device of claim 8, wherein the fixer fixing part is inserted into a space between the fixer supporting part and each of the plurality of panel supporting parts facing each other, and supports the plurality of panel supporting parts.

10. The display device of claim 8, wherein each of the plurality of fixers comprises:
an upper plate adhered to the display panel;
a fixer sidewall vertically coupled to a bottom of the upper plate; and
a lower plate coupled to a bottom of the fixer sidewall to face the upper plate, and provided at the guide panel,
wherein the cover insertion space is disposed between the upper plate and the lower plate.

11. The display device of claim 7, wherein the panel supporting part and the rib have define a right angle shape.

12. The display device of claim 11, wherein the side cover is inserted into a space between the fixer supporting part and each of the plurality of panel supporting parts facing each other.

13. The display device of claim 7, further comprising a backlight unit accommodated in the rear cover to irradiate light onto the display panel.

14. The display device of claim 13, further comprising a partition wall pad adhered to an inner upper surface of the fixer supporting part.

\* \* \* \* \*